US010625862B2

(12) United States Patent
Cook et al.

(10) Patent No.: US 10,625,862 B2
(45) Date of Patent: Apr. 21, 2020

(54) AIRCRAFT INTERIOR LAVATORY

(71) Applicant: B/E AEROSPACE, INC., Winston-Salem, NC (US)

(72) Inventors: Donald F. Cook, Arlington, WA (US); Liberty Harrington, Seattle, WA (US); Philipp Steiner, Seattle, WA (US); Robert K. Brauer, Seattle, WA (US); Trevor Skelly, Mercer Island, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/283,471

(22) Filed: Feb. 22, 2019

(65) Prior Publication Data

US 2019/0217940 A1 Jul. 18, 2019

Related U.S. Application Data

(63) Continuation of application No. 15/258,529, filed on Sep. 7, 2016, now Pat. No. 10,259,558, which is a (Continued)

(51) Int. Cl.
*B64D 11/02* (2006.01)
*B64C 1/10* (2006.01)
(Continued)

(52) U.S. Cl.
CPC .............. *B64D 11/02* (2013.01); *B64C 1/10* (2013.01); *B64D 11/06* (2013.01); *B64D 11/064* (2014.12); *B64F 5/00* (2013.01); *Y02T 50/46* (2013.01)

(58) Field of Classification Search
CPC ............ B64D 11/00; B64D 2011/0046; B64D 11/0023; B64D 11/06; B64D 2011/0617;
(Continued)

(56) References Cited

U.S. PATENT DOCUMENTS 2,650,368 A 9/1953 Evans
2,760,443 A 8/1956 Gobrecht
(Continued)

FOREIGN PATENT DOCUMENTS

CN 1867485 A 11/2006
CN 101218149 A 7/2008
(Continued)

OTHER PUBLICATIONS

Office Action on EP Application No. 18202015.6 dated Jul. 8, 2019. 6 pages.
(Continued)

Primary Examiner — Benjamin P Lee
(74) Attorney, Agent, or Firm — Donna P. Suchy

(57) ABSTRACT

A lavatory for an aircraft cabin includes a wall having a forward wall portion disposed immediately aft of and substantially conforming to an exterior aft surface of an aircraft cabin structure, such as a passenger seat, that is substantially not flat in a vertical plane. The forward wall portion includes a forward projection over an aft portion of the adjacent passenger seat. The forward wall portion can define a secondary space in the interior lavatory space, which can provide an amenity stowage space, and can include design elements providing visual space.

19 Claims, 1 Drawing Sheet

Related U.S. Application Data continuation of application No. 15/141,494, filed on Apr. 28, 2016, now Pat. No. 9,463,878, which is a continuation of application No. 14/709,378, filed on May 11, 2015, now Pat. No. 9,365,292, which is a continuation of application No. 14/043,500, filed on Oct. 1, 2013, now Pat. No. 9,073,641, which is a continuation of application No. 13/089,063, filed on Apr. 18, 2011, now Pat. No. 8,590,838.

(60) Provisional application No. 61/326,198, filed on Apr. 20, 2010, provisional application No. 61/346,835, filed on May 20, 2010.

(51) Int. Cl.
   *B64D 11/06* (2006.01)
   *B64F 5/00* (2017.01)

(58) Field of Classification Search
   CPC . B64D 2011/0665; B63B 11/00; B63B 11/02; B63B 29/00; B63B 29/02
   See application file for complete search history.

(56) References Cited

U.S. PATENT DOCUMENTS

| | | | |
|---|---|---|---|
| 2,914,001 A | 11/1959 | Murphy | |
| 3,738,497 A | 6/1973 | Betts et al. | |
| 4,055,317 A | 10/1977 | Greiss | |
| 4,884,767 A | 12/1989 | Shibata | |
| 5,150,863 A | 9/1992 | Hozumi | |
| 5,333,416 A | 8/1994 | Harris et al. | |
| 5,340,059 A | 8/1994 | Kanigowski | |
| 5,482,230 A | 1/1996 | Bird et al. | |
| 5,529,265 A | 6/1996 | Sakurai | |
| 5,577,358 A | 11/1996 | Franke | |
| 5,611,503 A | 3/1997 | Brauer | |
| 5,716,026 A | 2/1998 | Pascasio et al. | |
| 6,000,659 A | 12/1999 | Brauer | |
| 6,007,025 A * | 12/1999 | Coughren | B64D 11/02 105/329.1 |
| 6,079,669 A | 6/2000 | Hanay et al. | |
| 6,237,872 B1 | 5/2001 | Bar-Levav | |
| 6,520,451 B1 | 2/2003 | Moore | |
| 6,615,421 B2 * | 9/2003 | Itakura | B64D 11/02 244/118.5 |
| 6,742,840 B2 | 6/2004 | Bentley | |
| 6,822,812 B1 | 11/2004 | Brauer | |
| 6,874,731 B1 | 4/2005 | Brauer et al. | |
| 6,889,936 B1 | 5/2005 | Pho et al. | |
| D508,173 S | 8/2005 | Guard et al. | |
| D516,496 S | 3/2006 | Guard et al. | |
| D533,129 S | 12/2006 | Guard et al. | |
| 7,156,345 B2 | 1/2007 | Brauer et al. | |
| 7,222,820 B2 | 5/2007 | Wentland et al. | |
| 7,252,267 B2 | 8/2007 | Young et al. | |
| 7,284,287 B2 | 10/2007 | Cooper et al. | |
| 7,331,545 B2 | 2/2008 | Young et al. | |
| 7,448,574 B2 | 11/2008 | Young et al. | |
| 7,448,575 B2 * | 11/2008 | Cheung | B64D 11/00 244/118.6 |
| 7,469,860 B2 | 12/2008 | Young et al. | |
| 7,516,919 B2 | 4/2009 | Young et al. | |
| D606,923 S | 12/2009 | Young et al. | |
| D617,254 S | 6/2010 | Guard et al. | |
| 7,871,039 B2 | 1/2011 | Fullerton et al. | |
| 7,934,679 B2 * | 5/2011 | Bock | B64D 11/0604 244/118.6 |
| 8,087,613 B2 | 1/2012 | Fullerton et al. | |
| 8,096,502 B2 * | 1/2012 | Bock | B64D 11/0604 244/118.6 |
| 8,109,469 B2 * | 2/2012 | Breuer | B64D 11/02 244/118.5 |
| 8,162,258 B2 | 4/2012 | Joannis et al. | |
| 8,167,244 B2 * | 5/2012 | Johnson | B64D 11/0023 105/344 |
| 8,177,163 B2 | 5/2012 | Wilcynski et al. | |
| 8,590,838 B2 | 11/2013 | Cook et al. | |
| D705,909 S | 5/2014 | Koyama et al. | |
| 8,991,947 B2 * | 3/2015 | Lee | B64D 47/00 312/242 |
| 9,321,534 B2 * | 4/2016 | Grieve | A47K 4/00 |
| 9,327,836 B2 * | 5/2016 | Weitzel | B64D 11/06 |
| 9,359,077 B2 * | 6/2016 | Koyama | B64D 11/02 |
| 9,382,006 B2 * | 7/2016 | Koyama | B64D 11/02 |
| 9,428,274 B2 * | 8/2016 | Moje | B64D 11/00 |
| 9,457,903 B2 * | 10/2016 | Moje | B64D 11/00 |
| 9,862,490 B2 * | 1/2018 | Schliwa | B64D 11/02 |
| 9,862,491 B2 * | 1/2018 | McKee | B64D 11/02 |
| 9,908,623 B2 * | 3/2018 | Hashberger | B64D 11/00 |
| 10,023,314 B2 * | 7/2018 | Savian | B64D 11/02 |
| 2003/0193220 A1 | 10/2003 | Jensen | |
| 2005/0082430 A1 | 4/2005 | Young et al. | |
| 2006/0065783 A1 * | 3/2006 | Mills | B64D 11/00 244/118.6 |
| 2006/0192050 A1 | 8/2006 | Cheung et al. | |
| 2007/0164157 A1 | 7/2007 | Park | |
| 2007/0170310 A1 | 7/2007 | Bock et al. | |
| 2007/0241232 A1 | 10/2007 | Thompson | |
| 2007/0295863 A1 | 12/2007 | Thompson | |
| 2009/0050738 A1 | 2/2009 | Breuer et al. | |
| 2009/0050783 A1 | 2/2009 | Roberts | |
| 2009/0065642 A1 * | 3/2009 | Cheung | B64D 11/00 244/118.6 |
| 2009/0146004 A1 | 6/2009 | Plant | |
| 2009/0200422 A1 | 8/2009 | Johnson et al. | |
| 2009/0255437 A1 | 10/2009 | Hachet et al. | |
| 2010/0059625 A1 | 3/2010 | Saint-Jalmes et al. | |
| 2010/0181425 A1 | 7/2010 | Guering et al. | |
| 2011/0121134 A1 | 5/2011 | Schotte et al. | |
| 2011/0139930 A1 | 6/2011 | Sutthoff et al. | |
| 2011/0210205 A1 * | 9/2011 | Bock | B64D 11/0604 244/118.6 |
| 2011/0253835 A1 | 10/2011 | Cook et al. | |
| 2012/0025018 A1 | 2/2012 | France et al. | |
| 2012/0112505 A1 | 5/2012 | Breuer et al. | |
| 2012/0253752 A1 | 10/2012 | Brauer | |
| 2012/0273614 A1 | 11/2012 | Ehlers et al. | |
| 2012/0325964 A1 | 12/2012 | Hawkins et al. | |
| 2013/0206906 A1 | 8/2013 | Burrows et al. | |
| 2013/0320139 A1 * | 12/2013 | Cho | B64D 11/06 244/118.6 |
| 2014/0014774 A1 | 1/2014 | Pozzi et al. | |
| 2014/0027572 A1 | 1/2014 | Ehlers et al. | |
| 2014/0027574 A1 | 1/2014 | Obadia et al. | |
| 2014/0196206 A1 * | 7/2014 | Savian | B64D 11/02 4/664 |
| 2015/0239563 A1 | 8/2015 | Cook et al. | |
| 2015/0251760 A1 | 9/2015 | Hawkins et al. | |
| 2015/0363656 A1 | 12/2015 | Brauer | |

FOREIGN PATENT DOCUMENTS

| | | |
|---|---|---|
| CN | 101351384 A | 1/2009 |
| CN | 101588966 A | 11/2009 |
| CN | 101765541 A | 6/2010 |
| DE | 69422723 T2 | 6/2000 |
| DE | 69725542 T2 | 4/2004 |
| DE | 102007009863 A1 | 9/2008 |
| EP | 0 722 404 A1 | 4/1995 |
| EP | 0 850 834 A1 | 7/1998 |
| EP | 1 281 614 A1 | 2/2003 |
| EP | 1 685 023 | 8/2006 |
| JP | H05-246355 A | 9/1993 |
| JP | 2007-523002 A | 8/2007 |
| JP | 2009-513419 A | 4/2009 |
| WO | WO-03/026495 A2 | 4/2003 |
| WO | WO-2005/014395 A1 | 2/2005 |
| WO | WO-2005/080196 A1 | 9/2005 |
| WO | WO-2007/006938 A1 | 1/2007 |

(56) References Cited

FOREIGN PATENT DOCUMENTS

| WO | WO-2007/013164 A1 | 2/2007 |
|---|---|---|
| WO | WO-2009/073244 A1 | 6/2009 |
| WO | WO-2014/024046 A2 | 2/2014 |

OTHER PUBLICATIONS

Patent Reexamination Board Decision on CN Application No. 201380037324.6 dated May 30, 2019. 17 pages.
Search Report on EP Application No. 18202015.6 dated Jun. 18, 2019. 4 pages.
Second Board Opinion on Chinese Application No. 201380037324.6 dated Jan. 24, 2019. 10 pages.
Notice of Supplemental Authority in *B/E Aerospace, Inc.* v. *C&D Zodiac, Inc.*, Nos. 2019-1935, 2019-1936, dated Feb. 10, 2020, 3 pages.
B/E Aerospace, Inc.'s Opening Brief in case No. IPR2017-01275 and No. IPR2017-01276 dated Sep. 6, 2019. 218 pages.
B/E Aerospace, Inc's Reply Brief in case No. IPR2017-01275 & IPR2017-01276 dated Nov. 6, 2019. 22 pages.
C&D Zodiac, Inc's Reply Brief in case No. IPR2017-01275 & IPR2017-01276 dated Oct. 16, 2019. 44 pages.

\* cited by examiner

AIRCRAFT INTERIOR LAVATORY

CROSS-REFERENCES TO RELATED APPLICATIONS

This application is a continuation of U.S. application Ser. No. 15/258,529, filed Sep. 7, 2016, which is a continuation of U.S. application Ser. No. 15/141,494, filed Apr. 28, 2016, now U.S. Pat. No. 9,463,878, which is a continuation of U.S. application Ser. No. 14/709,378, filed May 11, 2015, now U.S. Pat. No. 9,365,292, which is a continuation of U.S. application Ser. No. 14/043,500, filed on Oct. 1, 2013, now U.S. Pat. No. 9,073,641, which is a continuation of U.S. application Ser. No. 13/089,063, filed on Apr. 18, 2011, now U.S. Pat. No. 8,590,838, which claims the benefit of U.S. Provisional Application No. 61/326,198, filed Apr. 20, 2010, and U.S. Provisional Application No. 61/346,835, filed May 20, 2010, all of which are incorporated by reference herein in their entirety.

BACKGROUND OF THE INVENTION

The present invention relates generally to aircraft enclosures, and more particularly relates to an aircraft cabin enclosure, such as a lavatory, an aircraft closet, or an aircraft galley, for example, including an aircraft cabin structure having an aft portion with a substantially vertically extending exterior aft surface that is substantially not flat in a vertical plane.

Aircraft lavatories, closets and other full height enclosures commonly have forward walls that are flat in a vertical plane. Structures such as passenger seats installed forward of such aircraft lavatories, closets and similar full height enclosures often have shapes that are contoured in the vertical plane. The juxtaposition of these flat walled enclosures and contoured structures renders significant volumes unusable to both the function of the flat wailed lavatory or enclosure and the function of the contoured seat or other structure. Additionally, due to the lack of a provision for structural load sharing, conventional aircraft lavatories require a gap between the lavatory enclosures and adjacent structures, resulting in a further inefficiency in the use of space.

Aircraft bulkheads, typically separating passenger cabin areas or classes of passenger service, are in common use, and typically have a contour permitting passengers seated behind the bulkhead to extend their feet modestly under the premium seats immediately forward of the bulkhead. These provide a comfort advantage to passengers seated behind the bulkhead, but provide no increased efficiency in the use of space, in that they do not enable the seats fore and aft of the bulkhead to be placed more closely together. Short, floor-mounted stowage boxes, typically no taller than the bottom cushion of a passenger seat, are often positioned between the flat wall of current lavatories or other enclosures and passenger seats. These provide no improvement to the utility or spatial efficiency of the lavatory or other enclosure. While they do provide some useful stowage for miscellaneous items, they do not provide sufficient additional stowage to provide more space for passenger seating.

It would be desirable to provide an aircraft lavatory or other enclosure that can reduce or eliminate the gaps and volumes of space previously required between lavatory enclosures and adjacent structures to allow an adjacent structure such as passenger seating installed forward of the lavatory or other enclosure to be installed further aft, providing more space forward of the lavatory or enclosure for passenger seating or other features than has been possible in the prior art. Alternatively, the present invention can provide a more spacious lavatory or other enclosure with no need to move adjacent seats or other structures forward.

It would also be desirable to provide an aircraft lavatory or other enclosure with a wall to bear loads from an adjacent passenger seating or other structure, permitting elimination of a required gap between the lavatory or other enclosure and the adjacent passenger seating or other structure, making more space available for other uses. In addition, enabling a lavatory or other enclosure to bear loads from an adjacent structure can reduce the combined weight of the lavatory or other enclosure and the adjacent structure.

It also would be desirable to provide an aircraft lavatory or other enclosure that can reduce or eliminate the gaps and volumes of space previously required between lavatory enclosures and adjacent structures, to allow the installation of an increased number of passenger seats, to increase the value of the aircraft. The present invention meets these and other needs.

SUMMARY OF THE INVENTION

Briefly, and in general terms, the present invention provides for an enclosure, such as a lavatory, an aircraft closet, or an aircraft galley, for example, for a cabin of an aircraft including a structure having an aft portion with a substantially vertically extending exterior aft surface that is substantially not flat in a vertical plane. The enclosure structure permits a combination of the enclosure with the structure in a manner that permits significant saving of space in the aircraft, which in turn permits more seats to be installed, or more space to be offered per seat, increasing the value of the aircraft.

Accordingly, in one presently preferred aspect, the present invention provides for an enclosure unit for a cabin of an aircraft including an aircraft cabin structure having an aft portion with an exterior aft surface that is substantially not flat in a vertical plane. The enclosure unit can be a lavatory, an aircraft closet, or an aircraft galley, for example. In one presently preferred aspect, the enclosure unit includes one or more walls that are taller than an adjacent aircraft cabin structure, the one or more walls defining an interior enclosure space and having a forward wall portion. The forward wall portion is configured to be disposed immediately aft of and adjacent to or abutting the exterior aft surface of the aircraft cabin structure, and the forward wall portion is shaped to substantially conform to the shape of the exterior aft surface of the aircraft cabin structure.

In another presently preferred aspect, the enclosure unit includes an enclosure stall unit, and the aircraft cabin structure is a passenger seat installed immediately forward of the enclosure stall unit. In another presently preferred aspect, the forward wall portion of the enclosure unit is configured to accept loads from the aircraft passenger seat. In another presently preferred aspect, the forward wall portion includes a forward projection configured to project over an aft portion of the adjacent passenger seat immediately forward of the enclosure stall unit.

In another presently preferred aspect, the enclosure is a lavatory, including a lavatory stall unit with one or more walls having a forward wall portion. The one or more walls define an interior lavatory space, and the forward wall portion is configured to be disposed immediately aft of and adjacent to or abutting an aircraft cabin structure having an exterior aft surface having a shape that is substantially not flat in a vertical plane. In a presently preferred aspect, the forward wall portion is shaped to substantially conform to the shape of the exterior aft surface of the aircraft cabin structure.

In another presently preferred aspect, the aircraft cabin structure is a passenger seat installed immediately forward of the lavatory stall unit, and the forward wall portion of the lavatory stall unit is configured to accept loads from the passenger seat. In another presently preferred aspect, the forward wall portion includes a forward projection configured to project over an aft portion of the adjacent passenger seat immediately forward of the lavatory stall unit. In another presently preferred aspect, the forward wall portion defines a secondary space in the interior lavatory space in an area forward of an aft-most portion of the forward wall portion. The secondary space can provide an amenity stowage space inside the lavatory stall unit in the area forward of an aft-most portion of the forward wall portion, and can include design elements providing visual space inside the lavatory in the area forward of an aft-most portion of the forward wall portion.

In another presently preferred aspect, the present invention provides for an assembly of an aircraft enclosure unit and an aircraft cabin structure for an aircraft cabin, the assembly in combination including an aircraft cabin structure having an exterior aft surface having a shape that is substantially not flat in a vertical plane, and an aircraft enclosure unit including at least one wall having a forward wall portion. The one or more walls define an interior enclosure space, the forward wall portion is disposed immediately aft of and adjacent to the aircraft cabin structure, and the forward wall portion is shaped to substantially conform to the shape of the exterior aft surface of the aircraft cabin structure. In another presently preferred aspect, the aircraft cabin structure is a passenger seat installed immediately forward of the aircraft enclosure unit. In another presently preferred aspect, the forward wall portion is configured to accept loads from the aircraft passenger seat. In another presently preferred aspect, the forward wall portion includes a forward projection configured to project over an aft portion of the adjacent passenger seat immediately forward of the aircraft enclosure unit.

In another presently preferred aspect, the aircraft enclosure unit is a lavatory stall, and the one or more walls define an interior lavatory space. In another presently preferred aspect, the forward wall portion defines a secondary space in the interior lavatory space in an area forward of an aft-most portion of the forward wall portion.

In another presently preferred aspect, the present invention provides for an assembly of an aircraft lavatory unit and an aircraft cabin structure for an aircraft cabin, in which the assembly in combination includes an aircraft cabin structure having an exterior aft surface having a shape that is substantially not flat in a vertical plane, and an aircraft lavatory stall unit including one or more walls having a forward wall portion. In another presently preferred aspect, the one or more walls define an interior lavatory space, the forward wall portion is disposed immediately aft of and adjacent to the aircraft cabin structure, and the forward wall portion is shaped to substantially conform to the shape of the exterior aft surface of the aircraft cabin structure. In another presently preferred aspect, the aircraft cabin structure is a passenger seat installed immediately forward of the aircraft lavatory stall unit, and wherein the forward wall portion of the aircraft lavatory stall unit is configured to accept loads from the passenger seat. In another presently preferred aspect, the forward wall portion includes a forward projection configured to project over an aft portion of the adjacent passenger seat immediately forward of the aircraft lavatory stall unit. In another presently preferred aspect, the forward wall portion defines a secondary space in the interior lavatory space in an area forward of an aft-most portion of the forward wall portion.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
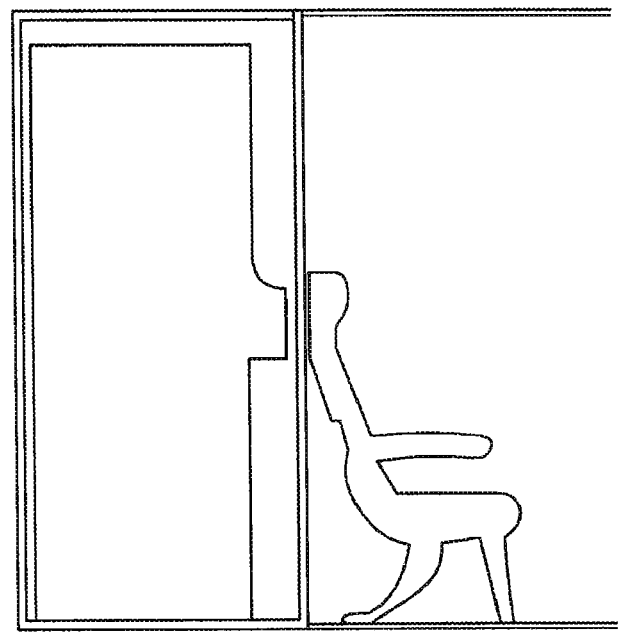
FIG. 1 is a schematic diagram of a prior art installation of a lavatory immediately aft of and adjacent to an aircraft passenger seat.
Figure 2:
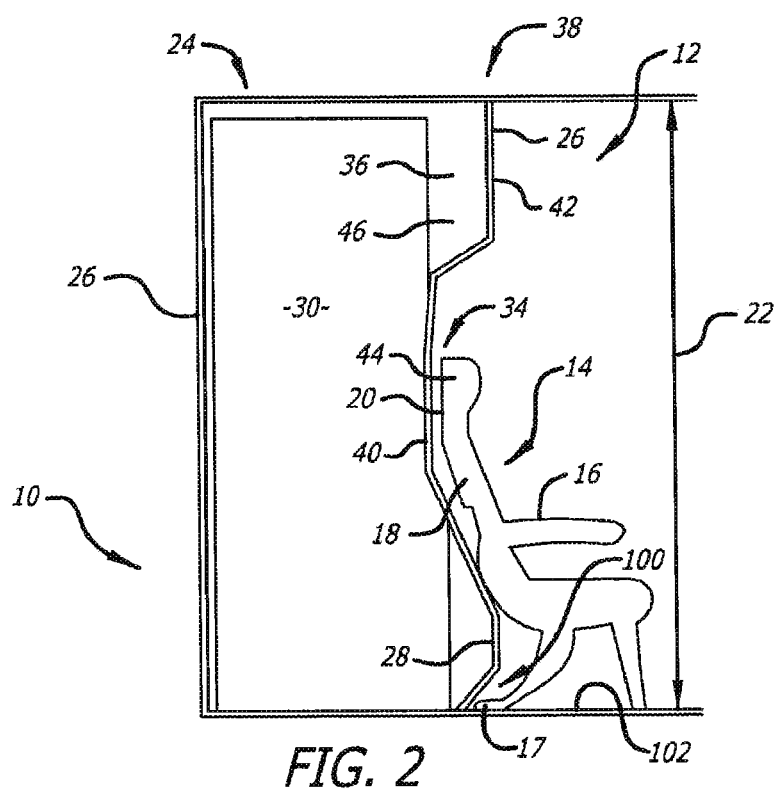
FIG. 2 is a schematic diagram of an installation of a lavatory according to the present invention immediately aft of and adjacent to or abutting an aircraft cabin passenger seat.

Referring to the drawings, which are provided by way of example, and not by way of limitation, the present invention provides for an enclosure 10, such as a lavatory for a cabin 12 of an aircraft (not shown), although the enclosure may also be an aircraft closet, or an aircraft galley, or similar enclosed or structurally defined spaces, for example. As is illustrated in FIG. 2, the cabin includes a structure 14, and the enclosure may be taller than the cabin structure. The cabin structure can be a passenger seat 16, for example, installed immediately forward of the enclosure and having an aft portion 18 with and exterior aft surface 20 that is substantially not flat in a vertical plane 22. The lavatory includes a lavatory stall unit 24 having one or more walls 26 having a forward wall portion 28. The one or more walls define an interior lavatory space 30, and the forward wall portion is configured to be disposed immediately aft of and adjacent to or abutting the exterior aft surface of the aircraft cabin structure. The forward wall portion has a shape that is substantially not flat in the vertical plane, and preferably is shaped to include a recess 34 such that the forward wall portion substantially conforms to the shape of the exterior aft surface of the aircraft cabin structure. In a presently preferred aspect, the forward wall portion of the lavatory stall unit is configured to accept loads from the passenger seat. As shown in FIG. 2, the forward wall portion 28 can be configured to provide a lower recess 100 formed between the forward wall portion 28 and the cabin deck 102. As also shown in FIG. 2, the lower recess 100 can be configured to receive at least a portion of an aft-extending seat support 17 therein. As can be seen by comparing FIG. 1 and FIG. 2, the recess 34 and the lower recess 100 combine to permit the passenger seat 16 to be positioned farther aft in the cabin than would be possible if the lavatory enclosure 10 included a conventional flat and vertical forward wall without recesses like that shown in FIG. 1, or included a forward wall that did not include both recesses 34, 100.

In another presently preferred aspect, the forward wall portion defines a secondary space 36 in the interior lavatory space in an area 38 forward of an aft-most portion 40 of the forward wall portion, and the forward wall portion includes a forward projection 42 configured to project over the aft portion of the adjacent passenger seat back 44 immediately forward of the lavatory stall unit. The secondary space can include an amenity stowage space 46 inside the lavatory stall unit in the area forward of the aft-most portion of the forward wall portion, and the secondary space can include design elements providing visual space, such as a visual perception of space, inside the lavatory in the area forward of an aft-most portion of the forward wall portion.

It will be apparent from the foregoing that while particular forms of the invention have been illustrated and described, various modifications can be made without departing from the spirit and scope of the invention. Accordingly, it is not intended that the invention be limited, except as by the appended claims.

The invention claimed is:

1. A lavatory for a cabin of an aircraft, comprising:
a plurality of walls including a first wall and a second wall opposite the first wall, wherein the first wall and the second wall define a lavatory stall unit for the lavatory, the second wall comprising:
an upper portion;
a middle portion defining an upper recess below the upper portion, wherein a first distance between the upper portion of the second wall and the first wall along a first line perpendicular to the first wall is greater than a second distance between the upper recess and the first wall along a second line perpendicular to the first wall and parallel to the first line; and
a lower portion below the middle portion, wherein a third distance between the lower portion and the first wall along a third line perpendicular to the first wall and parallel to the first line is greater than the second distance;
wherein at least an area of the upper portion, an area of the middle portion, and an area of the lower portion of the second wall are accessible from an interior of the lavatory stall unit.

2. The lavatory of claim 1, wherein the lower portion comprises a lower recess;
wherein a fourth distance between the lower recess and the first wall along a fourth line perpendicular to the first wall and parallel to the first line is less than the third distance; and
wherein the second wall extends from a ceiling portion and a floor portion and the fourth line extends along the floor portion.

3. The lavatory of claim 2, wherein the lower recess is configured to receive a seat support of an aircraft passenger seat, the seat support configured to interface with a floor of the cabin and hold a seat bottom of the aircraft passenger seat in an elevated position.

4. The lavatory of claim 1, wherein the upper recess is configured to receive a portion of an exterior aft surface of a seat back of an aircraft passenger seat when the seat back is in an unreclined position.

5. The lavatory of claim 1, further comprising:
a floor portion and a ceiling portion, wherein the second wall is coupled to the floor portion and the ceiling portion, the second wall comprising a first surface on an interior side of the lavatory stall unit and a second surface on an exterior side of the lavatory stall unit, wherein the second wall is a single piece from the ceiling portion to the floor portion.

6. The lavatory of claim 5, wherein the second wall has a thickness between the first surface and the second surface, wherein the thickness is uniform from the floor portion to the ceiling portion; and
wherein a first area on the first surface is exposed to the interior of the lavatory stall unit at the upper recess and a second area on the second surface at the upper recess is exposed to the cabin of the aircraft.

7. The lavatory of claim 1, further comprising:
a stowage space in the lavatory stall unit disposed between the upper portion and the first wall and disposed above a seat back of an aircraft passenger seat when the seat back is in an unreclined position, wherein the aircraft passenger seat is disposed outside of the lavatory stall unit and adjacent the second wall.

8. The lavatory of claim 7, further comprising:
a floor portion and a ceiling portion, wherein the second wall is coupled to the floor portion and the ceiling portion, the second wall comprising a first surface on an interior side of the lavatory stall unit and a second surface on an exterior side of the lavatory stall unit, wherein the second wall is a single piece from the ceiling portion to the floor portion, and wherein the second wall has a thickness between the first surface and the second surface, wherein the thickness is uniform and continuous from the floor portion to the ceiling portion, and wherein a portion of the first surface defines the stowage space.

9. The lavatory of claim 1, wherein an outermost portion of the upper portion intersects a vertical plane, and wherein the lavatory stall unit has less volume due to the upper recess than if the second wall was a straight, vertical wall aligned with the vertical plane, and cabin space of the aircraft outside of the lavatory stall unit has greater volume due to the upper recess than if the second wall was a straight vertical wall aligned with the vertical plane, whereby space savings is achieved for more passenger seating in the cabin or more space between passenger seats.

10. The lavatory of claim 1, wherein the second wall is configured to accept loads from an aircraft passenger seat.

11. A lavatory for a cabin of an aircraft, comprising:
a first wall; and
a second wall, the first wall and the second wall defining a lavatory stall unit having an interior, the second wall being a single piece wall structure continuous between a floor portion and a ceiling portion and comprising:
an upper portion;
a lower portion defining a lower recess extending towards the interior; and
a middle portion positioned between the upper portion and the lower portion and defining an upper recess extending towards the interior;
wherein the first and second walls support the lavatory stall unit.

12. The lavatory of claim 11, wherein the lower recess is configured to receive a seat support of an aircraft passenger seat, the seat support configured to interface with a floor of the cabin and hold a seat bottom of the aircraft passenger seat in an elevated position.

13. The lavatory of claim 12, wherein an outward-most portion of the lower portion intersects a vertical plane, and wherein the second wall enables securement of the seat support to the floor on the side of the vertical plane facing toward the interior such that the second wall provides additional cabin space for passenger seating than if the second wall was instead flat and aligned with the vertical plane.

14. The lavatory of claim 13, wherein a first distance between the first wall and the second wall at a top of the lavatory is greater than a second distance between the first wall and the second wall at a bottom of the lavatory.

15. The lavatory of claim 11, wherein the first wall is an aft wall and the second wall is a forward wall.

16. The lavatory of claim 15, wherein the upper recess is configured to receive a portion of an exterior aft surface of a seat back of an aircraft passenger seat in the cabin positioned adjacent the second wall when the aircraft passenger seat is in an unreclined position.

17. The lavatory of claim 15, wherein the second wall is configured to accept loads from an aircraft passenger seat or adjacent structures.

18. A lavatory for a cabin of an aircraft, comprising:
an aft wall; and
a forward wall comprising:
   an upper portion;
   a middle portion defining an aft-extending upper recess below the upper portion;
   a lower portion below the middle portion;
   wherein the lower portion includes a forward-most portion forward of the middle portion and intersecting a vertical plane;
   wherein the forward wall provides additional cabin space forward of the forward wall for additional passenger seating than if the forward wall was instead flat and aligned with the vertical plane;
wherein an interior of the lavatory is disposed between the aft wall and the forward wall, wherein an aft-facing surface of the lower portion is accessible from the interior, and wherein a forward facing surface of the lower portion is immediately adjacent a seat support of an aircraft passenger seat positioned forward of the lavatory, the seat support configured to interface with a floor of the cabin and hold a seat bottom of the aircraft passenger seat in an elevated position; and
wherein the lower portion defines an aft-extending second recess configured to enable positioning of the seat support aft of the vertical plane.

19. A lavatory for a cabin of an aircraft, comprising:
an aft wall; and
a forward wall comprising:
   an upper portion;
   a middle portion defining an aft-extending upper recess below the upper portion;
   a lower portion below the middle portion;
   wherein the upper portion includes a forward-most portion forward of the middle portion and intersecting a vertical plane;
   wherein the forward wall provides additional cabin space forward of the forward wall for additional passenger seating than if the forward wall was instead flat and aligned with the vertical plane;
   wherein the lower portion defines an aft-extending second recess configured to enable positioning of a seat support aft of the vertical plane.

* * * * *

(12) INTER PARTES REVIEW CERTIFICATE (3386th)
United States Patent
Cook et al.

(10) Number: US 10,625,862 K1
(45) Certificate Issued: Jan. 24, 2024

(54) AIRCRAFT INTERIOR LAVATORY

(71) Applicant: B/E AEROSPACE, INC.

(72) Inventors: Donald F. Cook; Liberty Harrington; Philipp Steiner; Robert K. Brauer; Trevor Skelly

(73) Assignee: B/E Aerospace, Inc.

Trial Number:

IPR2022-00749 filed Mar. 25, 2022

Inter Partes Review Certificate for:

Patent No.: 10,625,862
Issued: Apr. 21, 2020
Appl. No.: 16/283,471
Filed: Feb. 22, 2019

The results of IPR2022-00749 are reflected in this inter partes review certificate under 35 U.S.C. 318(b).

INTER PARTES REVIEW CERTIFICATE
U.S. Patent 10,625,862 K1
Trial No. IPR2022-00749
Certificate Issued Jan. 24, 2024

AS A RESULT OF THE INTER PARTES REVIEW PROCEEDING, IT HAS BEEN DETERMINED THAT:

Claims 1-19 are cancelled.

\* \* \* \* \*